(12) United States Patent
Lou (10) Patent No.: US 10,172,324 B2
(45) Date of Patent: Jan. 8, 2019

(54) STRUCTURE OF PET COMB (71) Applicant: Meng-Hsuan Lou, Taipei (TW)

(72) Inventor: Meng-Hsuan Lou, Taipei (TW)

(73) Assignee: JC-SUNNY INTERNATIONAL CO., LTD., Taipei (TW)

(*) Notice: Subject to any disclaimer, the term of this patent is extended or adjusted under 35 U.S.C. 154(b) by 0 days.

(21) Appl. No.: 15/553,760

(22) PCT Filed: Mar. 31, 2016

(86) PCT No.: PCT/CN2016/077957
§ 371 (c)(1),
(2) Date: Aug. 25, 2017

(87) PCT Pub. No.: WO2016/165560
PCT Pub. Date: Oct. 20, 2016

(65) Prior Publication Data
US 2018/0064066 A1 Mar. 8, 2018

(30) Foreign Application Priority Data

Apr. 17, 2015 (CN) ..................... 2015 2 0234269 U (51) Int. Cl.
*A01K 13/00* (2006.01)
*A45D 24/22* (2006.01)

(52) U.S. Cl.
CPC ............ *A01K 13/002* (2013.01); *A01K 13/00* (2013.01); *A01K 13/003* (2013.01); *A45D 24/22* (2013.01)

(58) Field of Classification Search
USPC .......................... 119/625, 611, 618; 15/1.52
See application file for complete search history.

(56) References Cited

U.S. PATENT DOCUMENTS 5,975,090 A * 11/1999 Taylor .................. A01K 13/002
132/116
2002/0096125 A1* 7/2002 Fong .................... A01K 13/002
119/664

(Continued)

FOREIGN PATENT DOCUMENTS

CN 2937913 Y 8/2007
CN 201499515 U 6/2010

(Continued)

*Primary Examiner* — Yvonne R Abbott-Lewis
(74) *Attorney, Agent, or Firm* — Muncy, Geissler, Olds & Lowe, P.C.

(57) ABSTRACT

A structure of pet comb comprises a case body, an outer lid for covering the placement part, an electric circuit board, an atomizer, a liquid container and a hair comb combined onto the bottom plane of the case body, wherein one end of the case body has an accommodation space, while the other end thereof has a placement part configured with an opening thereon; the liquid container includes at least a liquid and a sponge in contact with the liquid; and the atomizer can contact the sponge held in the liquid container such that, by means of the operation of the atomizer, the liquid on the sponge can be sprayed out through the openings of the accommodation part. Therefore, upon combing a pet's hairs by using the structure of pet comb according to the present invention, with the liquid atomization in the atomizer, it is possible to comb the pet and, at the same time, apply the atomized liquid onto the skin surface of the pet thereby increasing the effect of the liquid.

12 Claims, 8 Drawing Sheets

(56) References Cited

U.S. PATENT DOCUMENTS

2017/0367923 A1* 12/2017 Bergbacka ............. A01K 13/00
2018/0139928 A1*  5/2018 Takla ................... A01K 13/001

FOREIGN PATENT DOCUMENTS

| CN | 202714396 U   | 2/2013 |
| CN | 204616707 U   | 9/2015 |
| FR | 2366815 A1    | 5/1978 |
| JP | 2005-124508 A | 5/2005 |
| JP | 3198785 U     | 7/2015 |
| TW | M503095 U     | 6/2015 |

* cited by examiner

STRUCTURE OF PET COMB

BACKGROUND OF THE INVENTION

1. Field of the Invention

The present invention generally relates to a structure of pet comb; more specifically, it relates to a structure of pet comb capable of combing a pet and, at the same time, applying the atomized liquid onto the skin surface of the pet thereby increasing the effect of the liquid.

2. Description of Related Art

For modern people's lives, it is pretty popular to increase their living pleasure through raising pets, and pet-raisers are well aware that cats and dogs may change their hairs each year in spring and autumn seasons so there may be a great amount of hair falloffs during these periods of times. Such massive hair falloffs from the pet bodies may attach onto various objects or human bodies thus negative affecting indoor hygienic conditions and probably causing digestion problems if accidentally eaten. Therefore, it is necessary to frequently comb the hairs of pets so as to remove dirt and dusts on the fallen hairs and prevent hair entanglement, thus further improving blood circulations, enhancing skin health and relieving fatigue for the pets.

Moreover, the use of essence oils is quite a fad these days, and the typical application approach of essence oils for pets may include that, first, people spray the essence oil on the palm, then gently rub and stroke the whole body of the pet from top to bottom along the spine, lightly grasp and knead the surrounding areas of dog's head and ears, and finally massage the limbs; however, the above-said method for essence oil application onto pet's skin may not be actually effective due to hair entanglement of pets, so the user needs to previously comb the pet's hairs in order to massage the pet to successfully achieve the effect.

Consequently, it would be an optimal solution in case that it is possible to utilize atomized liquid onto the skin surface of the pet conjunctively upon combing the pet's hair, thereby increasing the effects of the applied liquid and allowing practical absorptions of the essence oil through pet's skin, thus further simultaneously reducing the time for essence oil applications on the pet.

SUMMARY OF THE INVENTION

The present invention relates to a structure of pet comb capable of combing a pet and, at the same time, applying the atomized liquid onto the skin surface of the pet thereby increasing the effect of the liquid.

The structure of pet comb allowing to achieve the aforementioned objectives comprises: a case body, including a top plane and a bottom plane, in which one end of the case body has an accommodation space, while the other end thereof has a placement part configured with an opening thereon; an outer lid for covering the placement part; an electric circuit board, installed within the accommodation space; a liquid container, set up on the accommodation part and including therein at least a liquid and a sponge in contact with the liquid, in which the liquid container is used to feed the liquid onto the sponge; an atomizer, electrically connected to the electric circuit board, in which the atomizer can contact the sponge held in the liquid container such that, by means of the operation of the atomizer, the liquid on the sponge can be sprayed out through the openings of the accommodation part; and a hair comb, combined onto the bottom plane of the case body.

More specifically, a clapboard is installed between the above-said accommodation space and the placement part.

More specifically, a fixation belt structure crossing over the case body is further combined onto the above-said case body.

More specifically, an anti-skid component surrounding the case body is further combined onto the above-said case body.

More specifically, a handle structure crossing over the case body as well as an anti-skid component surrounding the case body are further combined onto the above-said case body.

More specifically, the above-said anti-skid component is made of rubber materials.

More specifically, a ring component is further installed between the above-said liquid container and the openings of the placement part.

More specifically, the above-said ring component is made of rubber materials.

More specifically, the above-said liquid container is a replaceable assembly.

More specifically, the above-said liquid container can be fixedly installed onto the placement part and refilled with more liquid therein.

More specifically, the above-said liquid held in the liquid container can be an essence oil or lotion.

DETAILED DESCRIPTION OF THE PREFERRED EMBODIMENTS

Other technical contents, aspects and effects concerning the present invention can be clearly appreciated through the detailed descriptions on the preferred embodiments of the present invention in conjunction with the appended drawings.

Figure 1A:
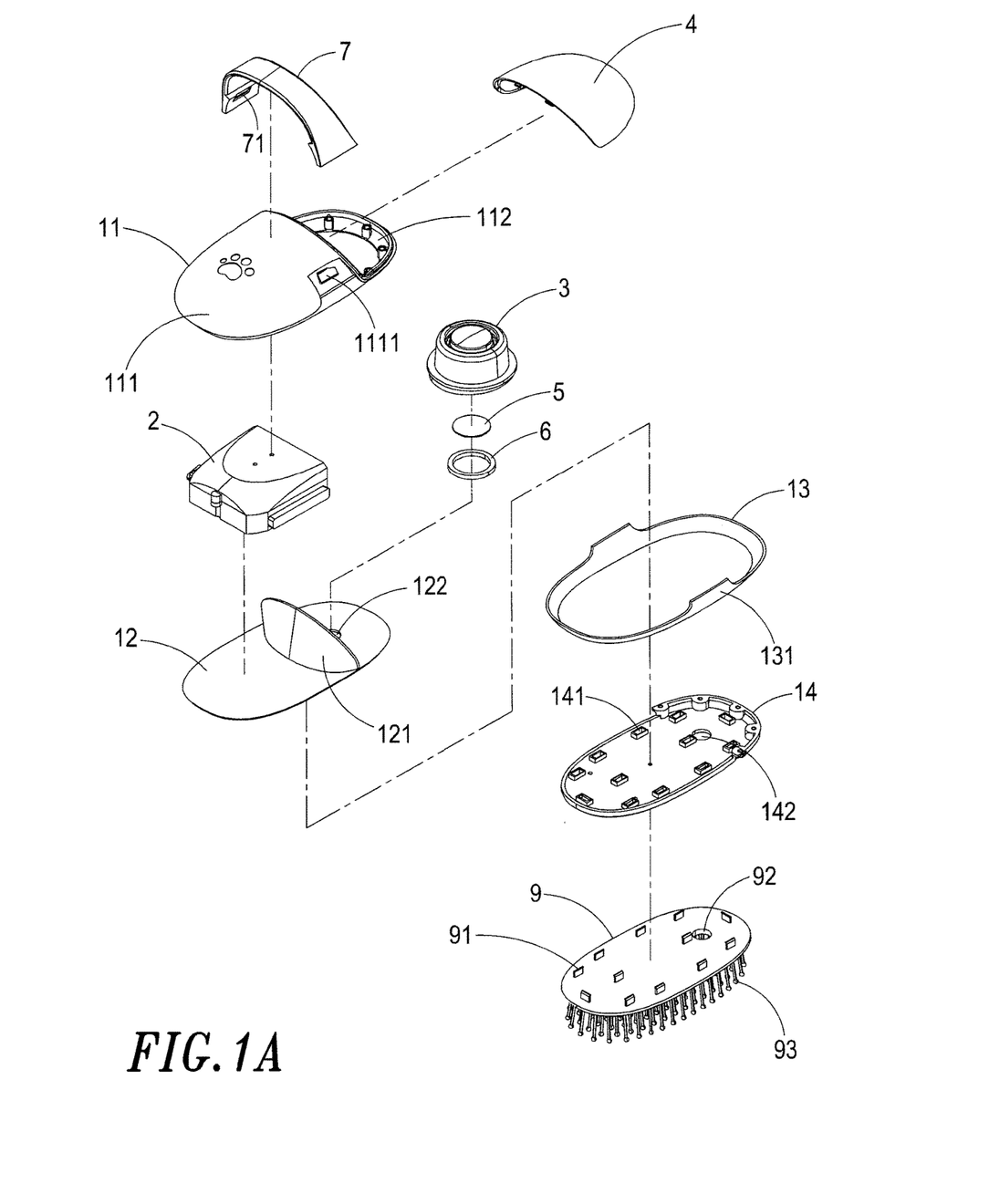
FIG. 1A shows a stereo disassembled structural view of the structure of pet comb according to the present invention.
Figure 1B:
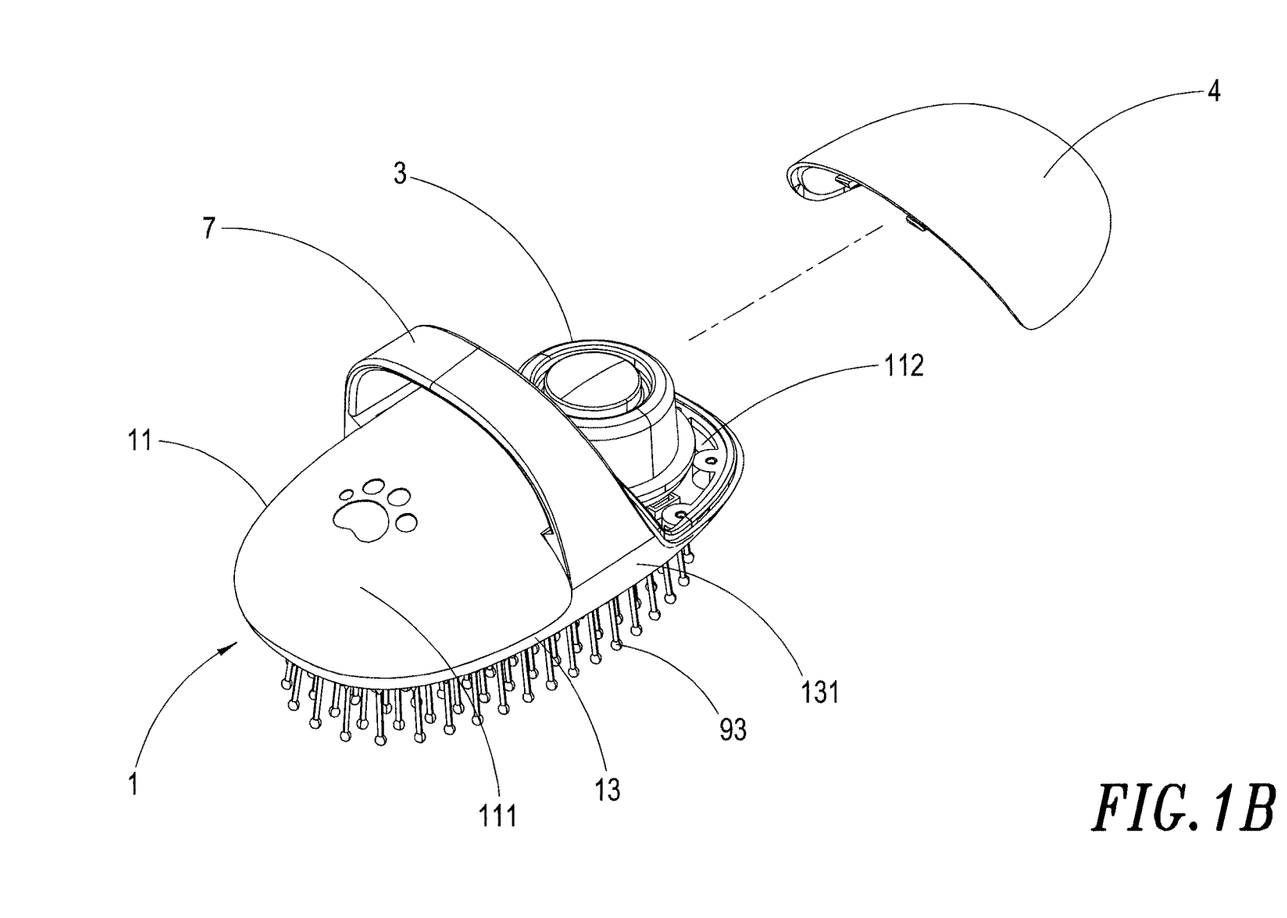
FIG. 1B shows a disassembled structural view of the liquid container and the outer lid in the structure of pet comb according to the present invention.
Figure 1C:
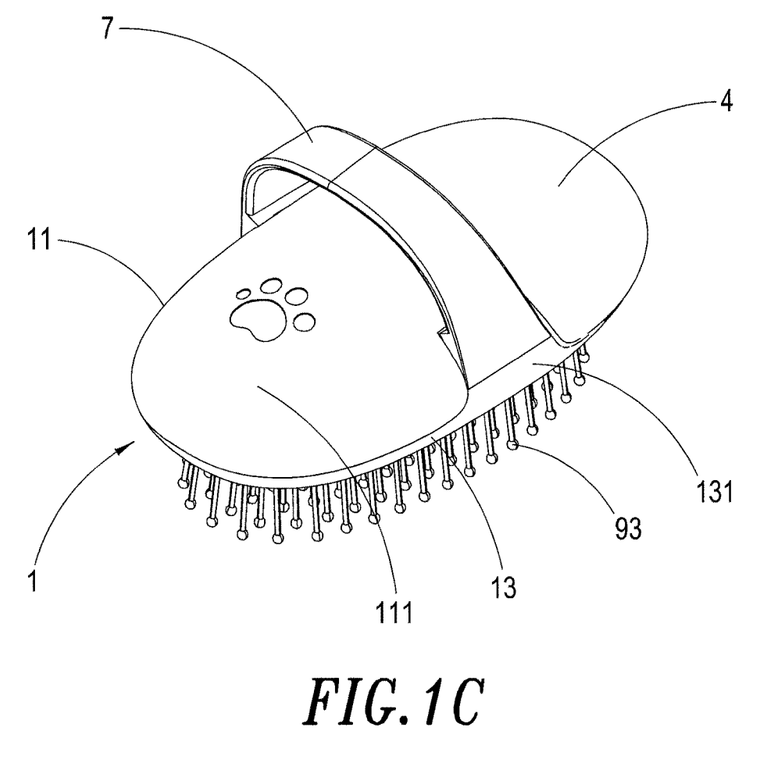
FIG. 1C shows an assembled structural view of the liquid container and the outer lid in the structure of pet comb according to the present invention.

Refer initially to FIGS. 1A, 1B and 1C, wherein a stereo disassembled structural view, a disassembled structural view of the liquid container and the outer lid as well as an assembled structural view of the liquid container and the outer lid in the structure of pet comb according to the present invention are respectively shown. It can be appreciated from these Figures that the structure of pet comb according to the present invention comprises a case body 1 including an upper case 11, a lower board 12, an anti-skid component 13 and a bottom board 14, in which the front end of the upper case 11 has a round curved plane 111 (i.e., the top plane); the round curved plane 111 extends backwards thereby forming a ring-shaped hollow positioning part 112, with both sides of the round curved plane 111 respectively having a snap part 1111 thereon.

Herein the lower board 12 is a board, a clapboard 121 extends out slant upwards from the surface of the lower board 12, and an opening 122 is configured on the surface of the lower board 12 corresponding to the ring-shaped hollow positioning part 112 such that, after combining the upper case 11 and the lower board 12, an accommodation space can be formed between the round curved plane 111 and the lower board 12, while a placement part is created between the ring-shaped hollow positioning part 112 and the lower board 12; the clapboard 121 is used to separate the accommodation space and the placement part.

Moreover, the accommodation space holds therein an electric circuit board 2, and a liquid container 3 is installed at the location in the accommodation part corresponding to the opening 122 and may be a replaceable assembly or a fixed container; then, the outer lid 4 can cover the ring-shaped hollow positioning part 112 (herein it can be seen that the outer lid 4 fully covers the accommodation part).

Besides, the anti-skid component 13 can penetrate through the lower board 12 and be fixed onto the snap part 1111 by means of the fixing plates 131 on the both sides, and the bottom board 14 can abut against the anti-skid component 13 and the lower board 12 upwards from beneath and be locked in fixation onto the ring-shaped hollow positioning part 112. In addition to the above-said base support function, the bottom board 14 is further provided with multiple plug holes 141 and an opening 142 corresponding to the opening 122, in which the plug hole 141 can be used to connect to the plugin 91 on the hair comb 9 such that the hair comb 9 having plural comb hair bodies 93 can be fixed onto the bottom board 14; and the hair comb 9 further includes an opening 92 corresponding to the opening 142.

Furthermore, an atomizer 5 and a ring component 6 are also installed under the liquid container 3, wherein the atomizer 5 may be an ultrasonic atomizer for atomizing the liquid infiltrating out from the liquid container 3 by means of continuous vibrations so as to spread the atomized liquid via the openings 122, 142, 42; therefore, upon using the structure of pet comb according to the present invention to comb a pet, the atomized liquid (which may be an essence oil or lotion such as insecticide potion etc. held within the liquid container 3 of the present invention) can be conjunctively applied onto the skin surface of the pet.

Additionally, a fixation belt structure 7 crossing over the round curved plane 111 of the case body 1 can be further combined onto the upper case 11 of the case body 1, which may be a wearable component, and the both sides of the fixation belt structure 7 respectively include a snap component 71 which can be snapped or buckled onto the snap part 1111 thereby allowing the fixation belt structure 7 to be firmly attached onto the upper case 11. From the Figures, it can be understood that a certain space has been retained between the fixation belt structure 7 and the round curved plane 111 such that the fingers of the user can freely penetrate through the fixation belt structure 7 and grasp the case body 1 thus allowing the user to firmly holding on the case body 1.

Figure 2:
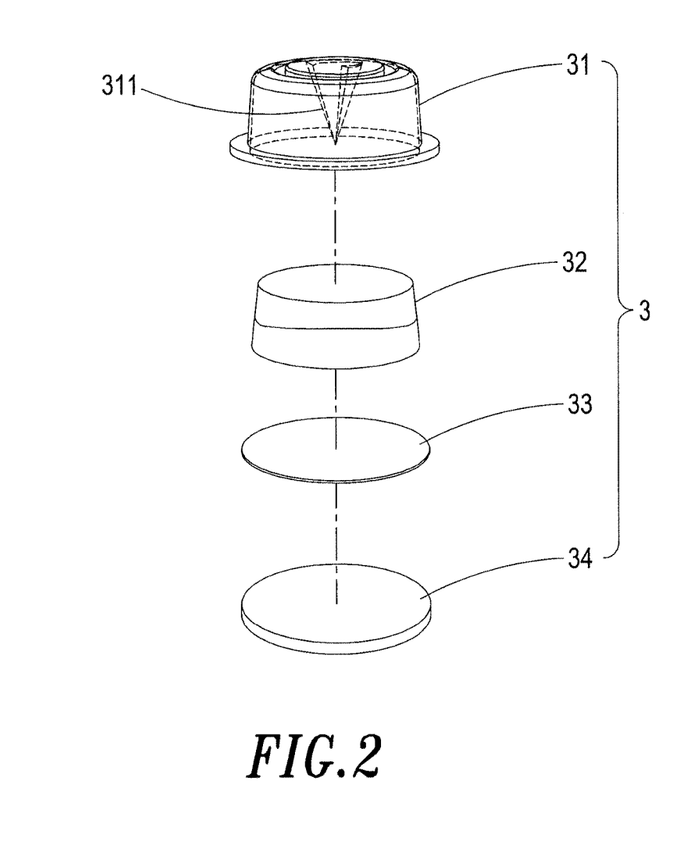
FIG. 2 shows an internal structural view of the liquid container in the structure of pet comb according to the present invention.
Figure 3A:
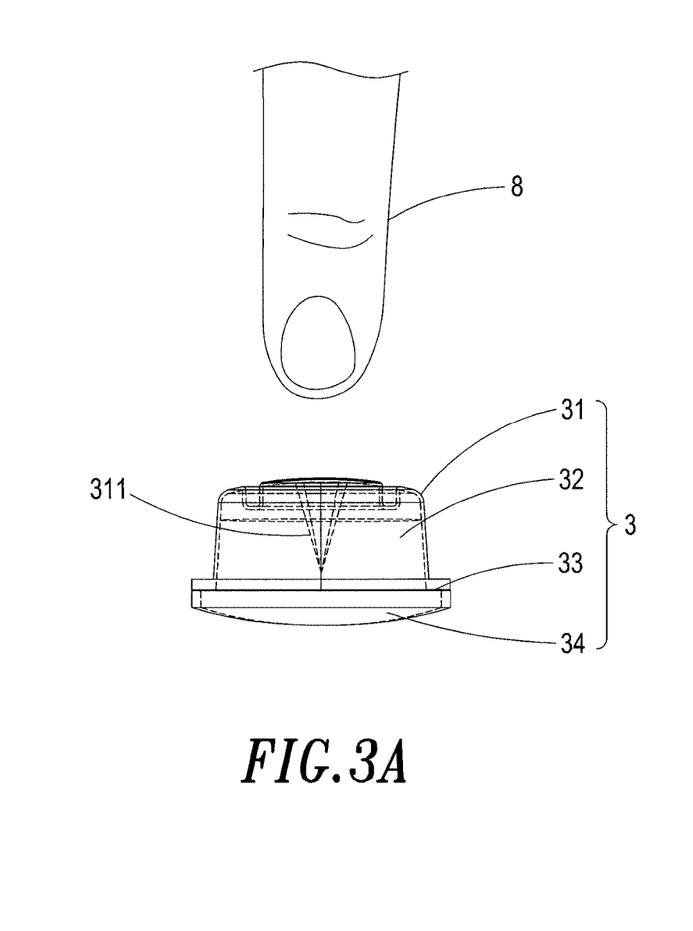
FIG. 3A shows an unlocked view of the liquid container in the structure of pet comb according to the present invention.
Figure 3B:
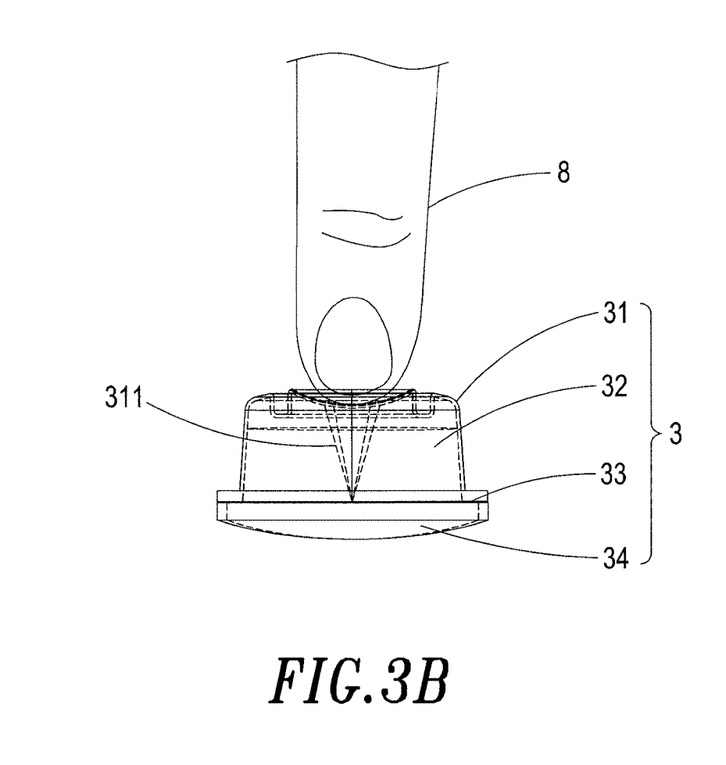
FIG. 3B shows an unlocked view of the liquid container in the structure of pet comb according to the present invention.

Moreover, as shown in FIG. 2, it can be appreciated that in case the liquid container 3 is a replaceable assembly, the structure thereof may comprise an upper cover 31, a liquid content 32, a sealing membrane 33 and a sponge 34, in which the inside of the capsule upper cover 31 is holding the liquid content 32 sealed by means of the sealing membrane 33, and the sponge 34 is combined with the exterior of the sealing membrane 33; besides, the inner edge at the top part of the capsule upper cover 31 includes a conic object 311 and position of the conic object 311 is very close to the sealing membrane 33. Accordingly, as shown in FIGS. 3A and 3B, when the user 8 wants to make the liquid content 32 flow towards the sponge 34, it is possible to press down the top plane of the capsule upper cover 31 such that the conic object 311 pierces the sealing membrane 33 thereby allowing the liquid content 32 held therein to flow towards the sponge 34 so the sponge 34 can absorb the liquid content 32.

The present embodiment is by no means limited to the aforementioned structure featuring piercing the liquid container 3 thus allowing the liquid content 32 to flow towards the sponge 34, it is also possible to install a conic object at the inner side of the outer lid 4 or alternatively on the placement part such that, when the liquid container 3 is set up on the placement part and close the outer lid 4, the conic object may pierce the liquid container 3 or else the conic object installed on the placement may pierce the liquid container 3, thereby allowing the liquid content 32 to flow towards the sponge 34. In addition, other similar puncturing or piercing mechanism and structure capable of achieving the same objective may be applied to the embodiment of the present invention as well, thus herein omitted for brevity.

Also, in case the liquid container 3 is a fixed container, the liquid container 3 may be fixed onto the placement part; the difference between this configuration and the above-said replaceable assembly lies in that, the liquid container 3 may be further configured with an injection hole such that, when the liquid within the liquid container 3 depletes, it is possible to add new additional liquid via this injection hole so as to replenish the internal liquid repeatedly.

Figure 4:
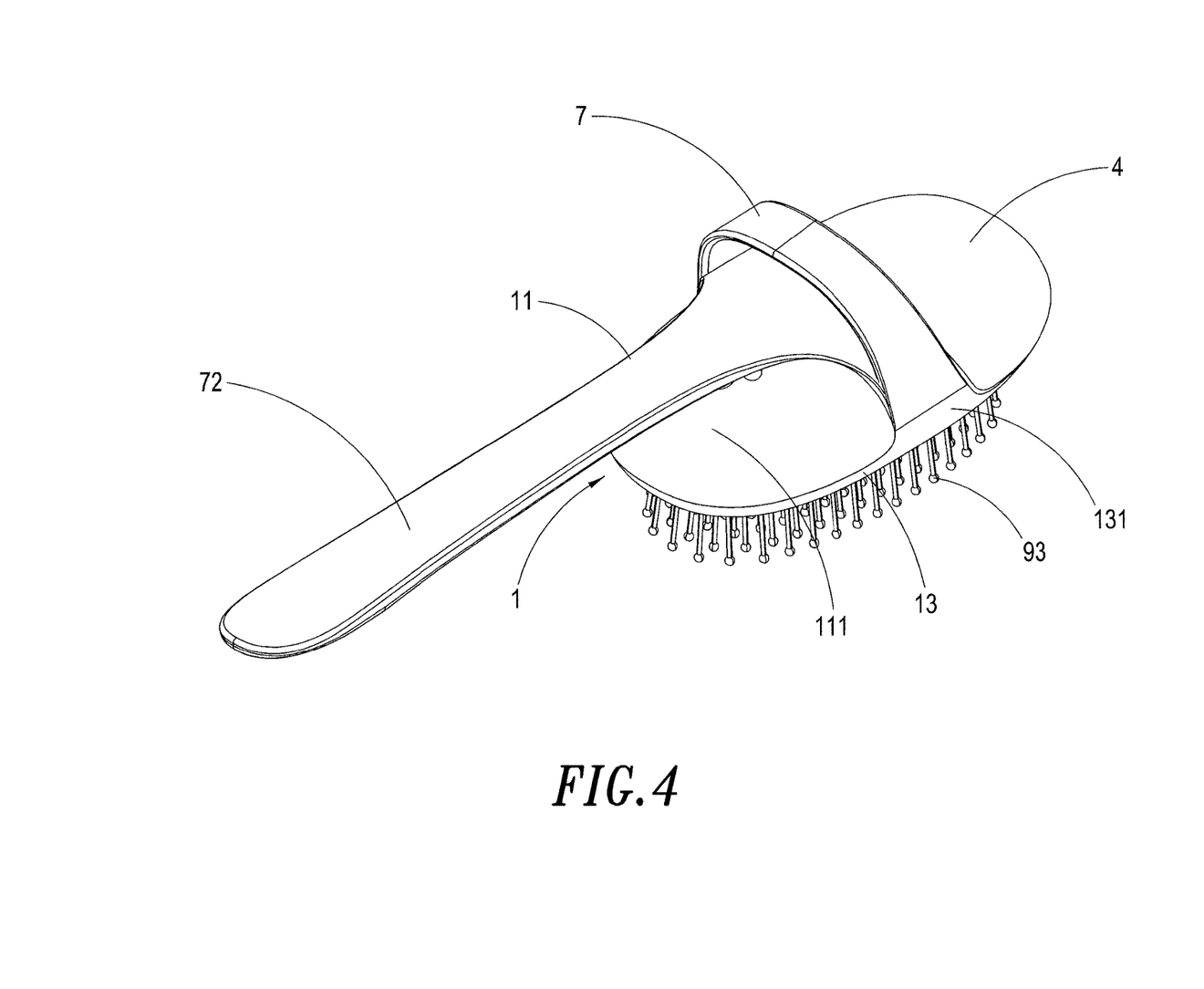
FIG. 4 shows a view for another embodiment of the fixation belt in the structure of pet comb according to the present invention.

Besides, as shown in FIG. 4, the fixation belt structure 7 can be replaced with a handle component; the difference between this configuration and FIG. 1C is that, there is no space or gap formed between the fixation belt structure 7 and the round curved plane 111, and a grip 72 may extend from the fixation belt structure 7 such that the user may directly hold on the grip 72.

Figure 5:
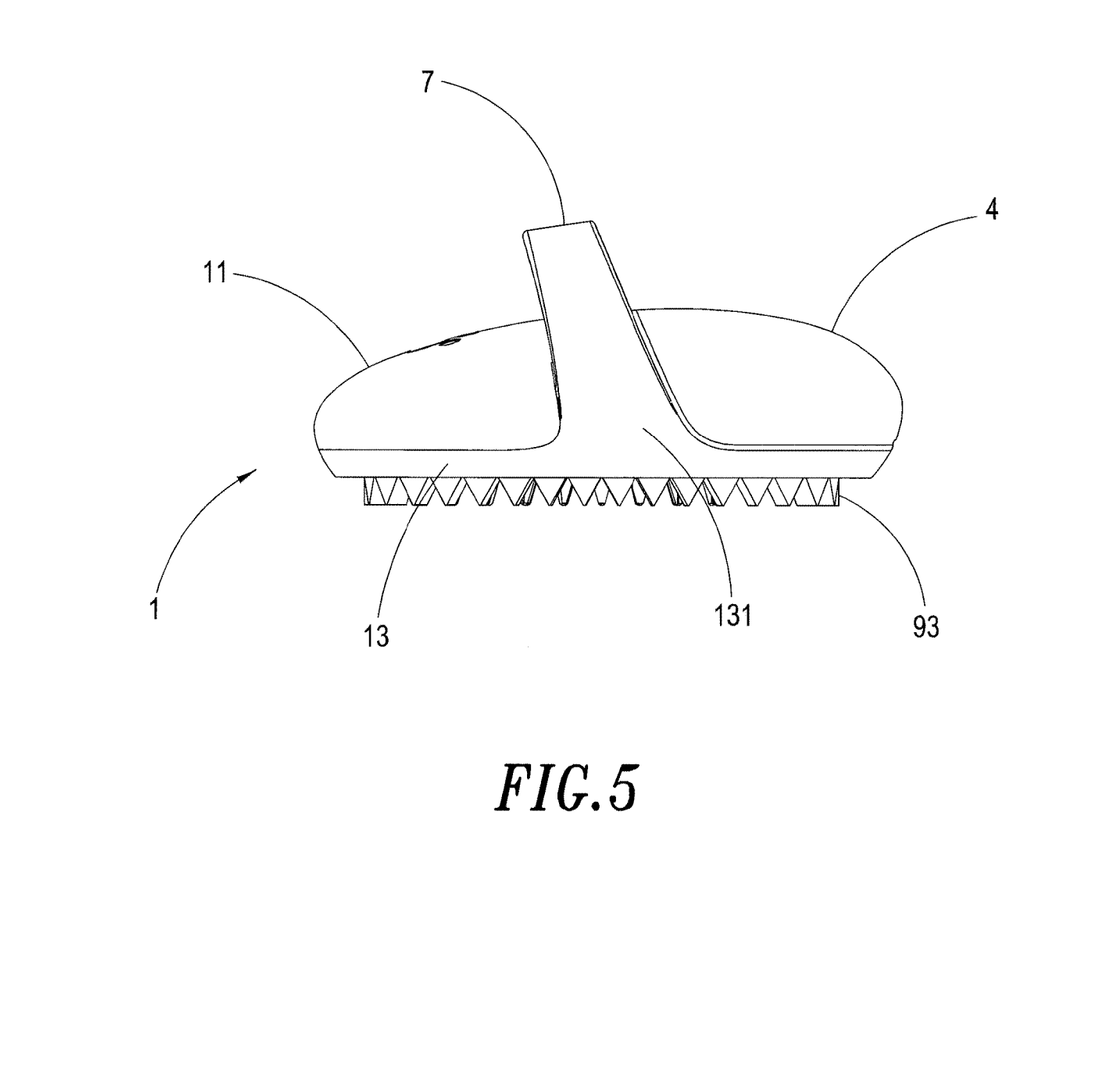
FIG. 5 shows a view for another embodiment of the hair comb in the structure of pet comb according to the present invention.

Furthermore, as shown in FIG. 5, the hair comb 9 attached on the bottom plane of the bottom board 12 may be replaced with another structures, and the difference therein between lies in that, the hair comb 9 in FIG. 5 may have thicker comb hair bodies 93, and, in addition to the comb hair bodies 93 shown in FIG. 5, it is also possible to install various kinds of hair comb 9 in order to fulfill different needs.

Compared with other conventional technologies, the structure of pet comb according to the present invention provides the following advantages:

1. In using the present invention to comb the pet's hairs, it is possible to utilize atomized liquid onto the skin surface of the pet conjunctively, so as to increase the effects of the applied liquid and allow practical absorptions of the essence oil through pet's skin, thus further simultaneously reducing the time for essence oil applications on the pet;

2. Different types of hair combs can be replaced and used in order to successfully fulfill different needs.

It should be noticed that, although the present invention has been disclosed through the detailed descriptions of the aforementioned embodiments, such illustrations are by no means used to restrict the scope of the present invention; that is, skilled ones in relevant fields of the present invention can certainly devise any applicable alternations and modifications after having comprehended the aforementioned technical characteristics and embodiments of the present invention without departing from the spirit and scope thereof. Hence, the scope of the present invention to be protected under patent laws should be delineated in accordance with the claims set forth hereunder in the present specification.

What is claimed is:

1. A structure of pet comb comprises:
   a case body, including a top plane and a bottom plane, in which one end of the case body has an accommodation space, while the other end thereof has a placement part configured with an opening thereon;
   an outer lid for covering the placement part;
   an electric circuit board, installed within the accommodation space;
   a liquid container, configured on the accommodation part and including therein at least a liquid and a sponge in contact with the liquid, in which the liquid container is used to feed the liquid onto the sponge;
   an atomizer, electrically connected to the electric circuit board, in which the atomizer can contact the sponge held in the liquid container such that, by means of the operation of the atomizer, the liquid on the sponge can be sprayed out through the openings of the accommodation part; and
   a hair comb, combined onto the bottom plane of the case body.

2. The structure of pet comb according to claim 1, wherein a clapboard is installed between the accommodation space and the placement part.

3. The structure of pet comb according to claim 1, wherein a fixation belt structure crossing over the case body is further combined onto the case body.

4. The structure of pet comb according to claim 1, wherein an anti-skid component surrounding the case body is further combined onto the case body.

5. The structure of pet comb according to claim 4, wherein the anti-skid component is made of rubber materials.

6. The structure of pet comb according to claim 1, wherein a handle structure crossing over the case body as well as an anti-skid component surrounding the case body are further combined onto the case body.

7. The structure of pet comb according to claim 6, wherein the anti-skid component is made of rubber materials.

8. The structure of pet comb according to claim 1, wherein a ring component is further installed between the liquid container and the openings of the placement part.

9. The structure of pet comb according to claim 8, wherein the ring component is made of rubber materials.

10. The structure of pet comb according to claim 1, wherein the liquid container is a replaceable assembly.

11. The structure of pet comb according to claim 1, wherein the liquid container can be fixedly installed onto the placement part and refilled with more liquid therein.

12. The structure of pet comb according to claim 1, wherein the liquid held in the liquid container is an essence oil or lotion.

* * * * *